United States Patent [19]

Pachuta

[11] 4,384,387
[45] May 24, 1983

[54] CONVEYOR TROLLEY ASSEMBLY WITH MOISTURE-RESISTANT BEARING SEAL

[75] Inventor: Martin Pachuta, Troy, Mich.

[73] Assignee: Jervis B. Webb Company, Farmington Hills, Mich.

[21] Appl. No.: 215,050

[22] Filed: Dec. 10, 1980

[51] Int. Cl.³ ..................... A47H 15/00; F16C 33/80
[52] U.S. Cl. ................................ 16/107; 105/150; 277/53; 308/187.2
[58] Field of Search ................. 16/91, 102, 106, 107; 308/187.1, 187.2, 190, 191; 277/24, 53, 25; 105/150, 153, 154, 155; 104/93, 94, 95

[56] References Cited

U.S. PATENT DOCUMENTS

| | | | |
|---|---|---|---|
| 1,503,920 | 8/1924 | Schneebeli | 308/187 |
| 1,737,036 | 11/1929 | Wego | 308/187 |
| 1,793,190 | 2/1931 | Philips | 308/187.1 |
| 2,074,901 | 3/1937 | Gotthardt et al. | 308/187.1 |
| 3,447,843 | 6/1969 | Shipman . | |
| 3,537,725 | 11/1970 | Frost | 308/187.2 |
| 3,553,765 | 1/1971 | Frost | 16/107 |
| 3,951,076 | 4/1976 | Knudsen et al. | 105/155 |
| 4,010,987 | 3/1977 | Jasperse et al. | 308/187.1 X |
| 4,040,684 | 8/1977 | Kapaar | 308/187.1 |
| 4,154,447 | 5/1979 | Francis, Jr. et al. | 308/187.1 X |
| 4,325,591 | 4/1982 | Otto | 308/187.2 |

OTHER PUBLICATIONS

Webb Continuous Overhead Conveyor Systems, Published by Jervis B. Webb Company, Title Page and p. 49 of Catalog No. 46 and a Copy of Drawing No. A-3485, Dated 7-31-46 of Jervis B. Webb Company.
Link-Belt General Catalog 600, Copyright 1934–Title Page and pp. 609, 611, 613, 618 and 626.
Link-Belt General Catalog 800, Title Page and pp. 1063, 1065, 1067, 1069, 1071, 1086 and 1091.
Copy of Title Page, p. 6 and p. 7 From a Catalog Published in 1952 by the Assignee of the Above Application.

*Primary Examiner*—Fred Silverberg
*Attorney, Agent, or Firm*—Joseph W. Farley

[57] ABSTRACT

A conveyor trolley assembly consisting of a trolley bracket having an axle carrying a hub, and an annular wheel carried on a bearing interposed between the hub and the wheel, is provided with a four-part, moisture resistant seal for the side of the bearing facing the trolley bracket. The seal is composed of an annular shield mounted on the axle and interlocked with the trolley bracket, a slinger seal mounted on the wheel inside of the shield, and second and third lubricant seals mounted on the wheel hub and on the wheel, respectively. Moisture which enters around the periphery of the shield either gravitates to a drain opening or is expelled by the action of the slinger seal.

4 Claims, 6 Drawing Figures

U.S. Patent May 24, 1983 Sheet 2 of 2 4,384,387
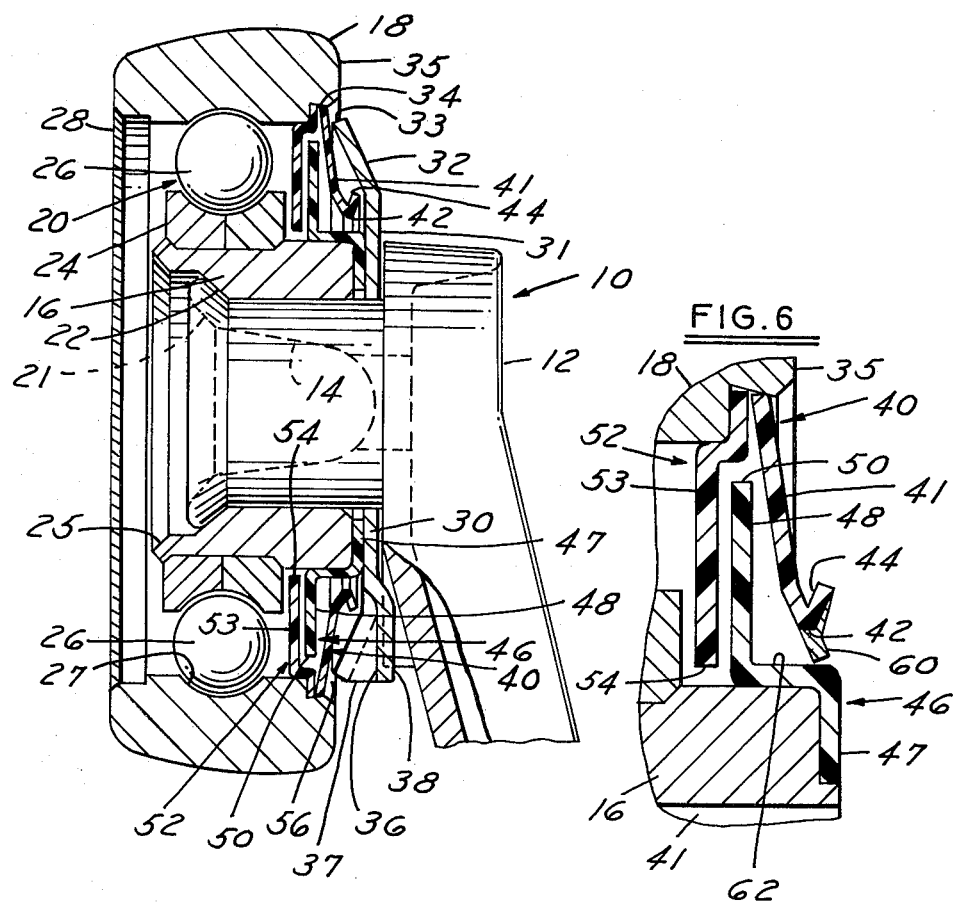
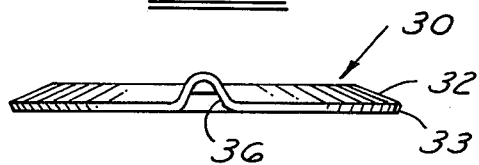

CONVEYOR TROLLEY ASSEMBLY WITH MOISTURE-RESISTANT BEARING SEAL

FIELD OF THE INVENTION

This invention relates to improvements in a conveyor trolley assembly which comprises a trolley bracket having an axle, an annular hub fixed to the axle, and an annular wheel rotatably carried by a bearing interposed between the hub and the wheel. The improvements are directed specifically to the sealing of the bearing by a combination of sealing elements carried by and interrelated with the foregoing components of the trolley assembly and providing a seal which is particularly moisture-resistant.

DESCRIPTION OF THE PRIOR ART

One prior example of a moisture-resistant seal assembly for a conveyor trolley wheel bearing is found in U.S. Pat. No. 3,537,725 and is composed of three sealing members arranged to provide radially inner and outer troughs for collecting moisture which drains from the outer trough. A second prior example of such a seal appears in U.S. Pat. No. 4,154,447 and again consists of three sealing members. One of these members is arranged axially between the other two and rotates with the wheel to sling moisture radially outwardly.

SUMMARY OF THE INVENTION

The present invention provides a seal formed by the combination of four sealing elements so arranged as to improve the retention of lubricant within the trolley wheel bearing and further to improve both the drainage and the expulsion of any moisture attempting to pass through the seal to the wheel bearing.

In the following summary and description of the present invention, the terms "axial", "axially" and "radially" refer to the axis of rotation of the trolley wheel; "axially inwardly" means the axial direction from the trolley wheel toward the trolley bracket; and, "axially outwardly" means the opposite axial direction.

The invention provides, in a conveyor trolley assembly comprising a trolley bracket having an axle projecting therefrom, an annular hub fixed to the axle, and an annular wheel rotatably carried by a bearing interposed between the outer periphery of the hub and the inner periphery of the wheel, the axially outer end of the bearing being sealed by a closure disk carried by the wheel, the improvement wherein the axially inner end of the bearing is sealed by the combination of an annular shield carried by the axle and located between the trolley bracket and the wheel hub, the shield extending radially and axially outwardly and having an outer periphery positioned in clearance relation with the inner periphery of the wheel adjacent to the axially inner edge thereof; a first annular seal fixed to the wheel and having a radially and axially inwardly extending portion spaced axially outwardly from the shield and terminating at a circumferential edge located adjacent to the shield and to the wheel hub, the axial spacing between the shield and said portion of the first seal decreasing at the outer periphery of the shield; a second annular seal fixed to the wheel hub and having a radially outwardly extending portion spaced axially outwardly of the first seal and terminating in a peripheral edge located adjacent to the inner periphery of the wheel; and, a third annular seal fixed to the wheel and having a radially inwardly extending portion spaced axially outwardly of the second seal and terminating in a peripheral edge located adjacent to the wheel hub.

Preferably, the annular shield is provided with a groove extending radially inwardly from the outer periphery of the shield and forming a drain opening between the shield and the trolley wheel, the drain opening being directed downwardly and axially inwardly of the inner edge of the wheel when the trolley assembly is in a normally operative upright position. A notch on the trolley bracket is engageable by the groove of the shield to provide locating means for fixing the position of the shield circumferentially on the axle.

Preferably also, the circumferential edge of the first seal is formed with a cup-shaped rim directed radially outwardly toward the clearance between the outer periphery of the shield and the inner periphery of the wheel. In an alternative construction, a flexible contact seal is bonded to the cup-shaped rim of the first seal and extends radially inwardly into engagement with the wheel hub.

DESCRIPTION OF THE DRAWING

The advantages of the foregoing features of the invention will be further explained in the description to follow of the presently preferred embodiments illustrated in the accompanying drawings in which:

FIG. 2 is an enlarged sectional elevation taken as indicated by the line 2—2 of FIG. 1 and showing the upper portion of the trolley assembly;

FIG. 5 is an end view of the shield member of FIG. 4, and

FIG. 6 is a sectional detail showing a modification of the sealing arrangement of FIG. 2.

DESCRIPTION OF THE PREFERRED EMBODIMENTS

Figure 1:
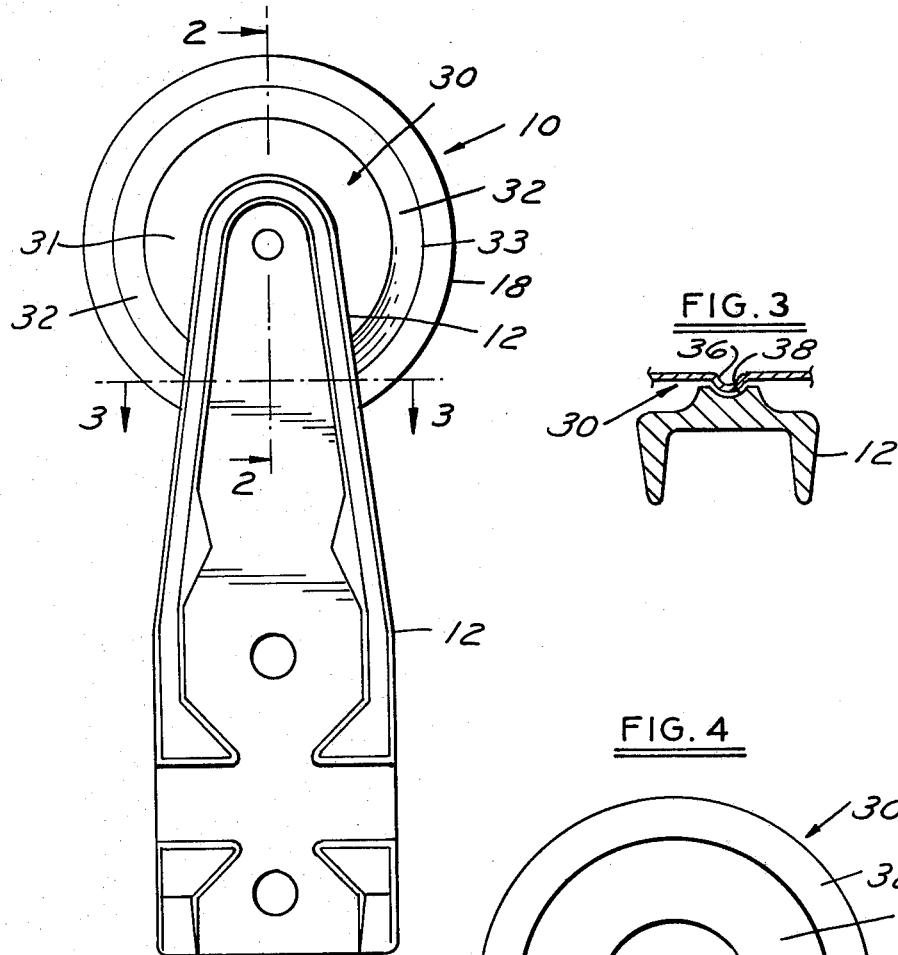
FIG. 1 is a side elevation of a trolley assembly of the invention.

The conveyor trolley assembly 10 shown in FIGS. 1 and 2 includes the conventional components of a trolley bracket 12 having a tubular axle 14 projecting therefrom, an annular hub 16 fixed to the axle 14, and an annular wheel 18 rotatably carried by a ball bearing assembly 20 interposed between the outer periphery of the hub 16 and the inner periphery of the wheel 18. The construction illustrated is one in which the axle 14 is formed integrally with the trolley bracket 12 and has an axially outer portion 21 which is swaged into engagement with a bevelled portion 22 on the hub 16; also, the bearing assembly 20 includes a split inner race 24 fixed to the hub 16 by swaging the axially outer end 25 of the hub. The outer race engaged by the balls 26 of the bearing assembly 20 is formed by an annular groove 27 in the inner periphery of the wheel 18. These particular details in the construction of the axle 14, the hub 16 and the bearing assembly 20 are not material to, or a necessary part of the present invention which is directed to the sealing of the axially inner end of the bearing assembly 20, the axially outer end thereof being sealed in the conventional manner by a closure disk 28 carried by the wheel 18.

Figure 4:
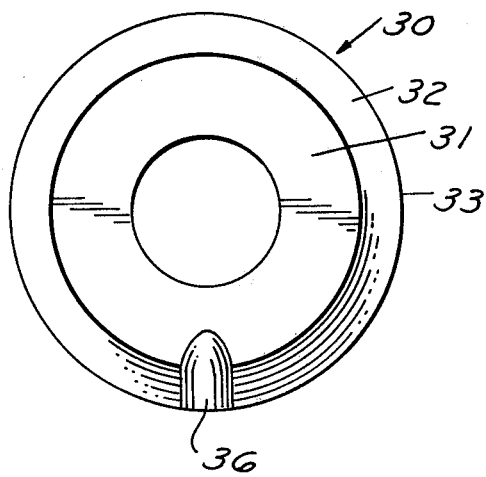
FIG. 4 is a side elevation of a shield member.

The improved seal for the axially inner end of the bearing is shown in FIG. 2. An annular shield 30 is carried by the axle 14 and is located between the trolley bracket 12 and the wheel hub 16. This shield is formed from sheet metal and has a portion 31 extending radially outwardly and a portion 32 which is inclined axially outwardly, the portion 32 having an outer periphery 33 positioned in clearance relation with the inner periphery 34 of the wheel adjacent to the axially inner edge 35 of the wheel. End and side elevational views of the shield 30 appear in FIGS. 4 and 5, respectively, and show that it is provided with a groove 36 that extends radially inwardly from the outer periphery 33 across the axially inclined portion 32 and into the radially extending portion 31.

Figure 3:
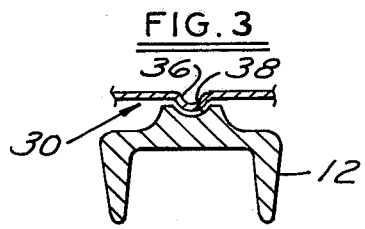
FIG. 3 is a sectional detail taken on the line 3—3 of FIG. 1.

As shown in FIG. 2, the groove 36 forms a drain opening 37 between the shield 30 and the wheel 18, which opening is directed downwardly and is located axially inwardly of the inner edge 35 of the wheel when the trolley assembly is in the normally operative upright position shown. A notch 38 (FIG. 3) on the trolley bracket 12 is engageable by the groove 36 of the shield 30 thereby providing interengageable locating means on the shield and the trolley bracket for fixing the position of the shield circumferentially on the axle 14.

A first annular seal 40 fixed to the inner periphery of the wheel 18 has a radially and axially inwardly extending portion 41 terminating at a circumferential edge 42 located adjacent to the shield 30 and to the wheel hub 16. The axial spacing between the portion 32 of the shield 30 and the portion 41 of the first seal 40 decreases in the radially outward direction and at the outer periphery 33 of the shield 30; and, the circumferential edge 42 of the first seal 40 is provided with a cup-shaped rim 44 which is directed outwardly toward the clearance between the outer periphery 33 of the shield and the inner periphery 34 of the wheel.

A second annular seal 46, fixed to the wheel hub 16 with the aid of a radially inwardly extending portion 47 sandwiched between the wheel hub and the shield 30, has a radially outwardly extending portion 48 which is spaced axially outwardly of the first seal 40 and which terminates in a peripheral edge 50.

Completing the seal construction is a third annular seal 52 fixed to the wheel 18 and having a radially inwardly extending portion 53 which is parallel to the portion 48 of the second seal 46 and which terminates in a peripheral edge 54 located adjacent to the wheel hub 16.

It will be appreciated from FIG. 2 that the only opening for the entry of moisture or other foreign matter is the annular passage 56 between the outer periphery 33 of the shield 30 and the inner periphery 34 of the wheel 18. When the wheel 18 is not revolving, any moisture entering through this passage 56 will gravitate to and out of the drain opening 37. Any moisture entering through the annular passage 56 during rotation of the wheel 18 tends to be caught by the portion 41 of the first seal 40 and the cup-shaped rim 44 thereof and driven back through the passage 56 by centrifugal action. The rotation of the first seal 40 with the wheel 18 has an expelling effect upon any entering moisture; and, this expelling effect is enhanced by the fact that the portion 41 of the first seal 40 is inclined axially inwardly in such a manner as to catch any entering moisture. The expelling effect is further enhanced by the progressive radially outwardly decreasing clearance between the portion 41 of the first seal 40 and the outwardly inclined portion 32 of the shield 30. This decreasing clearance tends to create what may be described as a venturi effect between the rotating first seal and stationary shield which venturi effect enhances the moisture expelling action.

The parallel portions 48 and 53 of the second and third seals, respectively, provide a passage which tends to attract lubricant supplied to the bearing through the fitting 58 on the trolley bracket 12 and thereby further inhibit the movement of moisture or any other foreign matter through the seal construction to the bearing assembly 20.

A modified form of the first annular seal 41 is shown in FIG. 6 which, for simplicity, does not include the shield 30. In this modified construction, a flexible annular contact seal 60 is bonded to the cup-shaped rim 44 of the first seal 41 and extends radially inward into wiping contact with the wheel hub 16, which at the point of contact includes the axial shoulder 62 of the second seal 46. The contact seal 60 effectively blocks any passage around the first seal 41 and may optionally be employed in cases where the trolley assembly is to be operated under conditions of severe ambient contamination.

I claim:

1. In a conveyor trolley assembly comprising a trolley bracket having an axle projecting therefrom, an annular hub fixed to the axle, and an annular wheel rotatably carried by a bearing interposed between the outer periphery of the hub and the inner periphery of the wheel, the axially outer end of the bearing being sealed by a closure disk carried by the wheel, the improvement wherein the axially inner end of the bearing is sealed by the combination of:

an annular shield carried by the axle and located between the trolley bracket and the wheel hub, the shield having a first portion extending radially outwardly from the wheel hub and having a second portion forming an axially outwardly inclined extension of said first portion, said second portion having an outer periphery positioned in clearance relation with the inner periphery of the wheel adjacent to the axially inner edge thereof, a groove provided in said second portion, said groove extending radially outwardly and axially inwardly from said inclined second portion and forming a drain opening between said shield and the wheel;

locating notch means on the trolley bracket engaged by said groove for fixing the position of said shield circumferentially on the axle with said drain opening directed downwardly and inwardly of the axial inner edge of the wheel when the trolley assembly is in a normally operative upright position;

a first annular seal fixed to the wheel and spaced axially outwardly from the shield, said first seal extending radially inwardly and axially inclined inwardly from the inner periphery of the wheel adjacent to said outer periphery of said shield and terminating at a circumferential edge located adjacent to said shield and adjacent to the wheel hub, the axial spacing between said second inclined portion of said shield and said first seal progressively decreasing in the radial outward direction to a minimum spacing at said outer periphery of said shield;

a second annular seal fixed to the wheel hub and having a radially outwardly extending portion spaced axially outwardly of said first seal and terminating in a peripheral edge located adjacent to the inner periphery of the wheel; and, a third annular seal fixed to the wheel and having a radially inwardly extending portion spaced axially outwardly of said second seal and terminating in a peripheral edge located adjacent to the wheel hub.

2. A conveyor trolley assembly according to claim 1 wherein said peripheral edge of said third seal is disposed radially inwardly relative to said circumferential edge of said first seal.

3. A conveyor trolley assembly according to claim 1 or 2 wherein said circumferential edge of said first seal is provided with a cup-shaped rim directed radially outwardly toward a converging discharge passage defined by said progressively radially outwardly decreasing axial spacing between said second inclined portion of said shield and said first seal.

4. A conveyor trolley assembly according to claim 3, wherein said circumferential edge of said first seal is further provided with a flexible contact seal bonded to said cup-shaped rim and extending radially inwardly into engagement with the wheel hub.

* * * * *